United States Patent [19]
Gordon et al.

[11] 3,811,365
[45] May 21, 1974

[54] BRAKE MECHANISM
[75] Inventors: Douglas M. Gordon, Allentown, Pa.; Thomas H. Phimister, Dearborn, Mich.
[73] Assignee: Indian Head, Inc., New York, N.Y.
[22] Filed: Mar. 2, 1973
[21] Appl. No.: 337,363

Related U.S. Application Data
[63] Continuation of Ser. No. 180,014, Sept. 13, 1971, abandoned.

[52] U.S. Cl. .............................. 92/63, 92/64, 92/99, 92/130
[51] Int. Cl. ............................................. F01b 7/00
[58] Field of Search ............. 92/63, 64, 98 R, 98 D, 92/99, 130, 132

[56] References Cited
UNITED STATES PATENTS
| | | | |
|---|---|---|---|
| 3,479,927 | 11/1969 | Woodward | 92/64 X |
| 3,112,959 | 12/1963 | Kateley | 92/63 X |

FOREIGN PATENTS OR APPLICATIONS
| | | | |
|---|---|---|---|
| 40,028 | 2/1971 | Australia | 92/63 |

Primary Examiner—Edgar W. Geoghegan
Assistant Examiner—Abraham Hershkovitz
Attorney, Agent, or Firm—Mellin, Moore & Weissenberger

[57] ABSTRACT

A brake-actuating mechanism for use in a pneumatic brake system is disclosed. The mechanism includes an emergency chamber having an upper actuating chamber with a narrowed neck portion and a service chamber with diaphragms sealed in each chamber. A push rod engages both diaphragms and the mechanism includes an axially mounted brake-operating rod and suitable fluid conduits communicating with the chambers. An actuating spring is disposed in the emergency chamber for urging a piston therein having a flat bearing plate portion and an integral upstanding pilot boss and the emergency diaphragm in contact therewith from a cocked position toward a wall separating the chambers. Means are associated with the spring and the emergency chamber for shielding the emergency diaphragm from contact with the spring while axially guiding and aligning the piston and actuating spring while the actuating spring moves the piston from the cocked position toward the wall and compressed air moves the piston toward the cocked position away from the wall.

2 Claims, 4 Drawing Figures

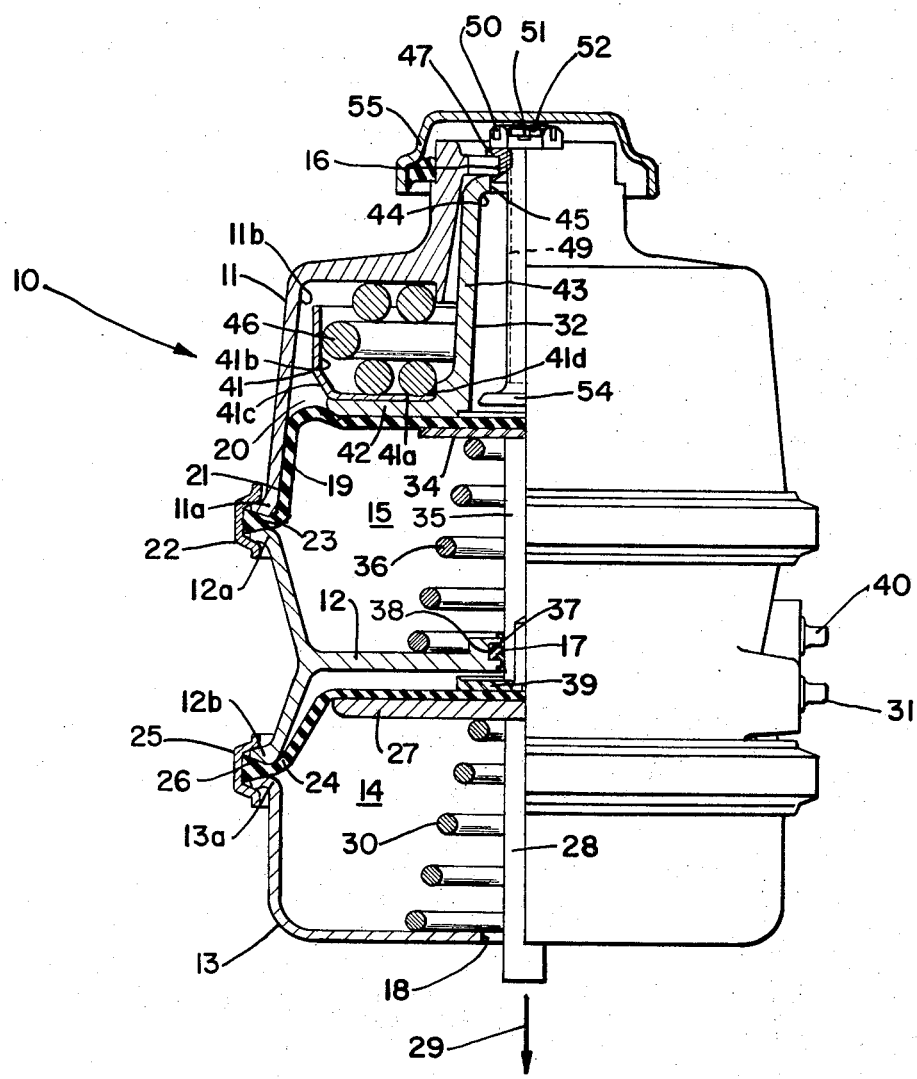
FIG_1
INVENTORS
DOUGLAS M. GORDON
THOMAS H. PHIMISTER

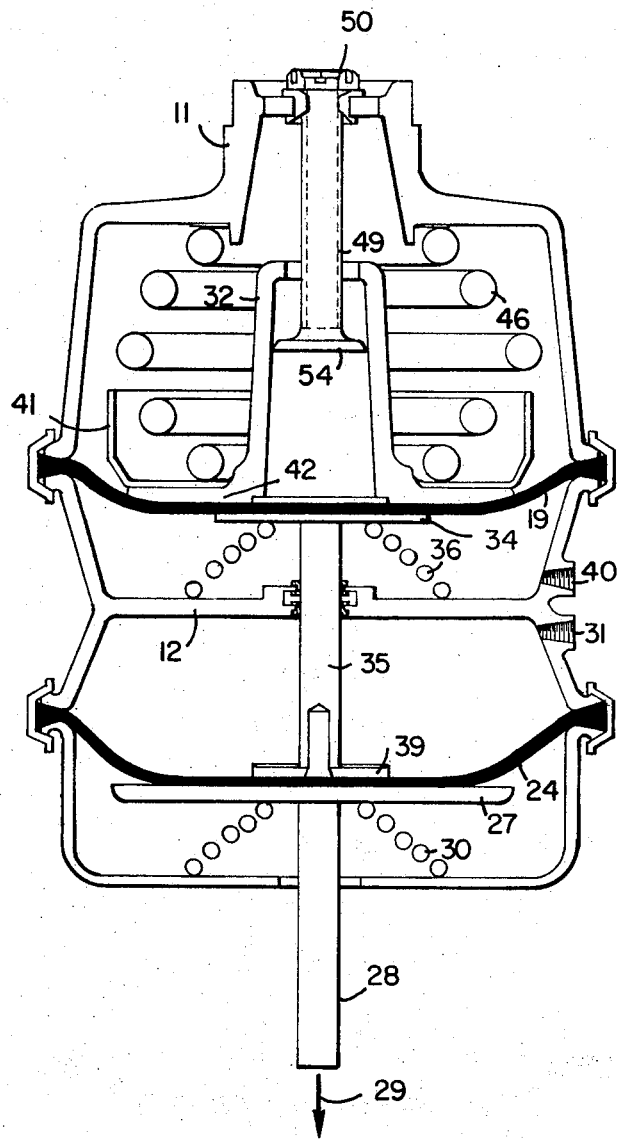
FIG_2

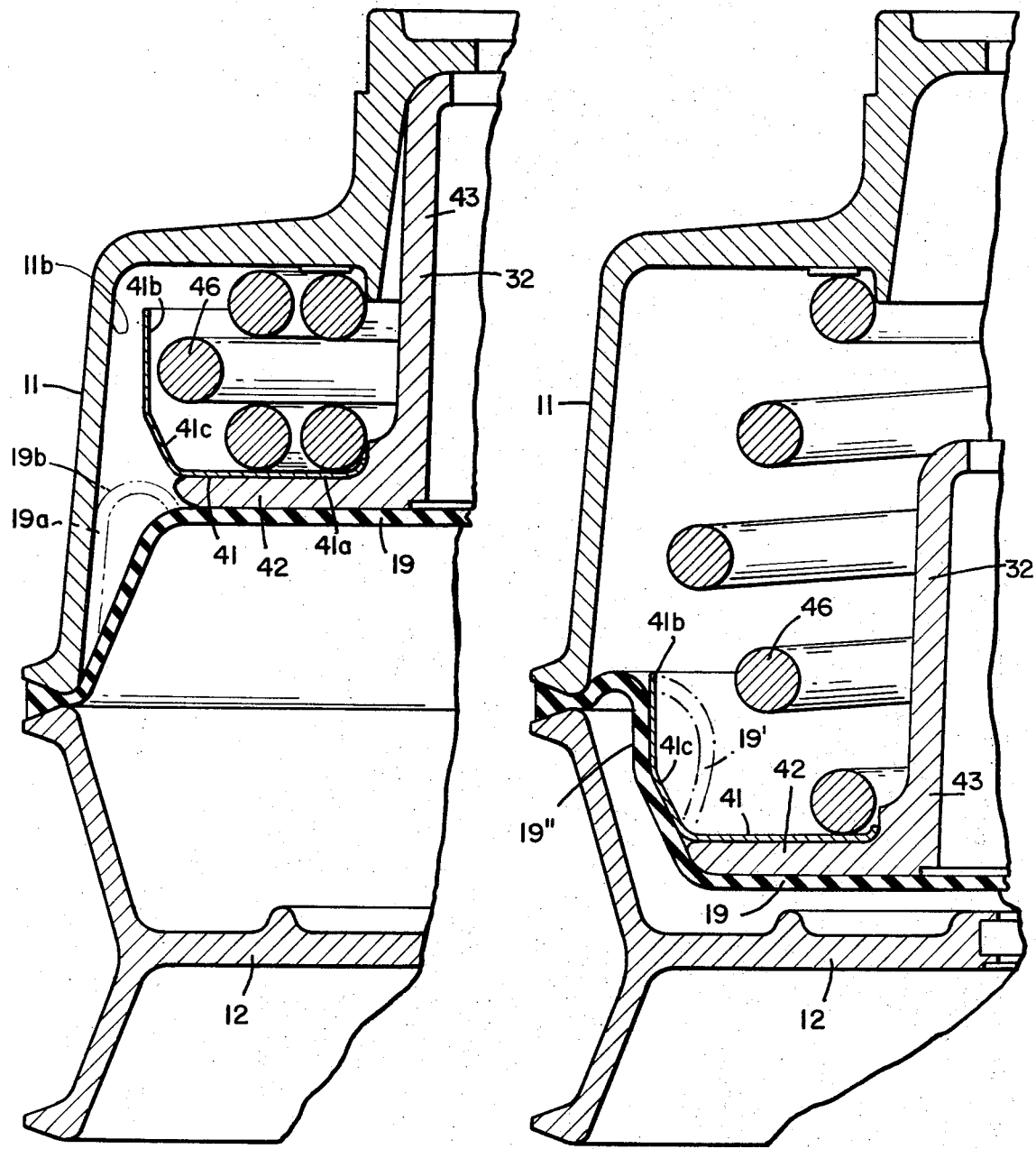
FIG_3B  FIG_3A

3,811,365

BRAKE MECHANISM

CROSS-REFERENCE TO OTHER APPLICATION

This application is a continuation of application Ser. No. 180,014 for "Brake Mechanism," filed Sept. 13, 1971, now abandoned by Douglas M. Gordon and Thomas H. Phimister.

BACKGROUND OF THE INVENTION

1. Field of the Invention

The invention relates to brake mechanisms for use in a pneumatic brake system; and, more particularly, to means for protecting the diaphragm of such brake mechanisms from spring damage while axially guiding and aligning a piston and actuating spring therein.

2. Description of the Prior Art

Heavy-duty brakes are normally equipped with pneumatic brake systems. Pressure from a master pressure source operates on a piston or diaphragm to move it and associated members to apply the brakes to the wheels through any well-known linkage. It is now conventional that an auxiliary or emergency braking system be provided which is actuated in the event of a loss of pressure in the master pressure source. The emergency system operates on the piston or diaphragm in place of the pressure normally derived from the defective master pressure source.

It is known in the art to provide a compact brake mechanism for a vehicle which includes a service chamber and an emergency chamber that may be conveniently reset after emergency application to release the brakes of the vehicle. However, in application, it has been found that problems may arise in such mechanisms if the power spring in the actuating chamber breaks. The broken spring may rupture the spring chamber diaphragm resulting in a complete loss of spring hold-off air pressure. This would cause all of the spring actuators in the brake mechanism to apply the brakes and would leave the vehicle in a condition where it could not be moved and air pressure could not be built up in the spring brake system to compress any of the springs. This is undesirable and could result in serious traffic hazards and possible accidents.

SUMMARY OF THE INVENTION

It is an object of this invention to provide a brake mechanism for a vehicle which includes a service chamber and an emergency chamber and includes means for protecting the emergency diaphragm of such mechanism from damage caused by a broken actuating spring.

It is a further object of this invention to provide such a brake mechanism with means for axially guiding and aligning the piston and spring in the actuating chamber while the spring moves the piston in reciprocating stroke motion.

It is a still further object of this invention to provide means associated with such brake mechanism for prolonging the life of an emergency diaphragm used therein.

These and other objects are preferably accomplished by providing a mechanism which includes an emergency chamber and a service chamber with diaphragms sealed in each chamber. A push rod engages both diaphragms and the mechanism includes an axially mounted brake-operating rod and suitable fluid conduits communicating with the chambers. An actuating spring is disposed in the emergency chamber for urging a piston therein having a flat bearing plate portion and an integral upstanding pilot boss and the emergency diaphragm in contact therewith from a cocked position toward a wall separating the chambers. Means are associated with the spring and the emergency chamber for shielding the emergency diaphragm from contact with the spring while axially guiding and aligning the piston and actuating spring during reciprocating stroke motion.

BRIEF DESCRIPTION OF THE DRAWINGS

FIG. 1 is a vertical view of the novel brake mechanism taken on its longitudinal axis, and shows the mechanism in a set or cocked position;

FIG. 2 is a diagrammatic sectional view corresponding to the view of FIG. 1 and shows the mechanism in the position that occurs after response to a loss of pressure; and FIGS. 3A and 3B are vertical sectional views of a portion of the brake mechanism of FIG. 1 showing the operation of the brake mechanism of the invention.

DESCRIPTION OF THE PREFERRED EMBODIMENT

Referring now to the drawings, the brake mechanism is generally referred to by the reference numeral 10 and is basically cylindrical. The housing consists of an emergency cap 11, a divider wall section 12 and a service cap 13. The divider wall section 12 divides the housing into a lower service chamber 14 and an upper emergency chamber 15. The emergency cap 11 defines emergency cap aperture 16, the divider wall section 12 defines divider wall aperture 17, and the service cap 13 defines service cap aperture 18.

An emergency diaphragm 19 divides emergency chamber 15 into an upper actuating chamber 20 and a lower pressure chamber 21. The emergency diaphragm 19 is hermetically sealed between divider wall section 12 and emergency cap 11 by retainer ring 22, which compresses flanges 11a and 12a of emergency cap 11 and divider wall 12, respectively, against the enlarged peripheral section 23 of diaphragm 19.

Service diaphragm 24 is hermetically positioned between divider wall section 12 and service cap 13 by means of retainer ring 25, which compresses flanges 12b and 13a against the enlarged peripheral section 26 of service diaphragm 24.

The service chamber 14 and service diaphragm 24 conventionally cooperate with bearing plate 27 and brake-operating rod 28 to operate the brakes through any well-known linkage as brake-operating rod 28 is moved in the direction shown by arrow 29 in FIG. 1. Brake-operating rod 28 extends through service cap aperture 18 and is slidable therein. It is automatically returned from its brake-applying position by service diaphragm return spring 30. Service orifice 31 communicates with a service pressure line (not shown). The vehicle divider operates the pressure valve of this line through his brake pedal to actuate service diaphragm 24 and brake-operating rod 28. Mounting bolts (also not shown) may, of course, be provided to mount the mechanism 10 in a fixed position on a vehicle.

As previously stated, emergency chamber 15 is divided by emergency diaphragm 19 into an actuating chamber 20 and a pressure chamber 21. Pressure chamber 21 includes bearing plate 34, push rod 35 and emergency diaphragm return spring 36. Push rod 35 is slidably and hermetically mounted in divider wall aperture 17 by means of a suitable seal 37 seated in recess 38 of divider wall aperture 17. Bearing plate 39 is attached to push rod 35 to provide a bearing surface for action against service diaphragm 24. Emergency orifice 40 communicates with both a master pressure source (not shown) and pressure chamber 21.

Actuating chamber 20 includes a piston 32 therein which is comprised of a push or bearing plate 42, which is in contact with emergency diaphragm 19. Bearing plate 42 includes an upstanding pilot boss in the form of a tubular sleeve 43 integral therewith extending axially to emergency cap 11. Tubular sleeve 43 is provided with shoulder portion 44 which defines sleeve aperture 45. Actuating spring 46 is mounted axially about tubular sleeve 43 and extends from emergency cap 11 to bearing plate 42.

An apertured diaphragm shield 41 is disposed within actuating chamber 20 which shield 41 is preferably of a suitable metal, such as steel or the like. Shield 41 includes a first generally horizontal thrust washer portion 41a upon which spring 46 rests. Portion 41a extends outwardly from sleeve 43 to substantially the end of plate 42, then curves upwardly generally parallel to sleeve 43 to form a generally vertical portion 41b terminating at a point below the upper wall of cap 11 (and thus the upper wall of actuating chamber 20). As can be seen in FIG. 1, the configuration of shield 41 serves to retain spring 46 as will be explained more fully below. An upstanding flange portion 41d on shield 41 surrounds tubular sleeve 43.

Flanged bushing 47 is seated in emergency cap aperture 16 and contains a conventional vent (not shown). Threaded member 49 is axially mounted and extends from the exterior of actuating chamber 20 in threaded engagement through flanged bushing 47, sleeve aperture 45, and into tubular sleeve 43. A hexagonal nut 50 is threadably mounted on its exerior end. Nut 50 contains passage 51 which, when aligned with passage 52 of threaded member 49, allows the insertion of a conventional locking pin (not shown). Nut 50 is thus fixed and cannot rotate on threaded member 49 unless the locking pin is removed. Dirt may be kept out of the assembly by breather cap 55 and a foam filter (not shown).

A cap 54 is preferably integrally provided at the other end of threaded member 49.

Having thus described the structure of the present invention, its operation is best understood with reference first to FIGS. 1 and 2. FIG. 1 shows the mechanism in a position in which the brakes are not applied either by the operator or the emergency system and fluid pressure holds spring 46 in a cocked position. The service brakes are operated by fluid pressure introduced through service orifice 31 into the area between divider wall 12 and service diaphragm 24. Service diaphragm 24, in response to the pressure, forces bearing plate 27 and brake-operating rod 28 in the direction of arrow 29 to apply the brakes. When the pressure is released, service diaphragm return spring 30 returns brake-operating rod 28, bearing plate 27 and service diaphragm 24 back to the position shown in FIG. 1.

In the event that there is a loss of pressure in the braking system, the emergency provision is actuated. FIG. 1 shows the actuating spring 46 in a compressed position exerting a force on bearing plate 42. Bearing plate 42 is normally held in a cocked position against the force of actuating spring 46 by pressure in chamber 21. That pressure is derived from the master pressure source, which is in communication with pressure chamber 21 through emergency orifice 40. In response to a loss of pressure, actuating spring 46 is no longer held in a compressed position by pressure in pressure chamber 21 and releases its energy, pushing bearing plate 42, emergency diaphragm 19, bearing plate 34, push rod 35, bearing plate 39, service diaphragm 24, bearing plate 27, and brake-operating rod 28 in the direction of arrow 29 to apply the brakes and stop the vehicle.

The emergency brake-applying position of the mechanism is shown diagrammatically in FIG. 2. It may be seen that actuating spring 46 is extended and return springs 30 and 36 are compressed, and brake-operating rod 28 is in a brake-applying position.

The foregoing has explained in general terms the operations of the brake mechanism of the invention. The function of the diaphragm shield 41 with respect to the brake mechanism will now be described. Very broadly, the purpose of shield 41 is to protect diaphragm 19 from damage caused by breaking of spring 46 and to axially guide and align piston 32 and spring 46 when spring 46 moves piston 32 in reciprocating stroke motion. As discussed hereinabove, diaphragm 19 is used to convert pressure of compressed air from orifice 40 to force. This force is used to balance or overcome power spring 46 and hold it in a full "off" position. FIG. 3A shows the power spring portion of the brake mechanism 10 of FIGS. 1 and 2 in detail. This is the condition 1 position wherein shield 41 is shown at the full "on" position with diaphragm 19 pressurized and which condition will now be described. Reference numeral 19' shows the approximate shape and position of diaphragm 19 when pressurized with air without shield 41 and with the piston 32 at full "on" stroke. Portion 19' would extend into the interior of chamber 20 and toward spring 46 were it not for the presence of shield 41 (shield 41 shown as holding diaphragm 19" away from spring 46, thus shielding it from contact with spring 46 when in position).

The condition 2 position of FIG. 3B will now be described. This position shows diaphragm 19 pressurized with piston 32 and spring 46 at full "off" position. The shield 41 and the side wall 11b of emergency cap 11 combine to enclose the fully compressed spring 46 and effectively shield diaphragm 19.

To compress spring 46 from condition 1 to condition 2, air pressure must increase. As the pressure builds up and moves piston 32 upwardly, a portion 19a of diaphragm 19 bulges upwardly between the side wall 11b of cap 11 and the piston plate 42. In this manner, the diaphragm 19 rolls onto the side wall 11b of cap 11 of one diameter and either off of shield 41, or out of the rounded shape if there were no shield 41, both at a smaller diameter. This action continues, with the bulged portion of diaphragm 19 becoming more highly stressed in tension as the air pressure increases, until the full "off" position is reached with nearly all of the available material lying on the side wall 11b of cap 11 and the rest of it bulging over to the plate 42 of piston 32. During the stroking action, then, diaphragm 19 experiences a continuous rolling action and "wipes" past any portion of the spring 46. This holds true for either rising or falling pressure.

Should power spring 46 break so as to produce a short coiled section of spring 46, such a section could at some stroked position be too short to remain in contact with both the side wall 11b of cap 11 and the piston formed by sleeve 43 and plate 42. This section would then be a free part which could contact diaphragm 19. If the jagged end thereof touched the diaphragm 19, the diaphragm 19 could be easily punctured due to the aforementioned wiping action thereof. The shield 41 serves to prevent such accidental puncturing.

The results of the rupturing of the diaphragm 19 would be drastic. A complete loss of spring hold-off air pressure in a vehicle braking system would occur. This loss of pressure would cause all of the spring actuators to apply the brakes and would leave the vehicle in a condition whereby it could not be moved and air pressure could not be built up in the spring brake system to compress any of the springs.

In addition to the safety feature of protecting diaphragm 19 from breaking of spring 46, shield 41 also provides a means to guide the piston-spring combination (i.e., spring 46, piston 32, including sleeve 43 and plate 42) on the central axis of the spring chamber 20. The air pressure acting on the diaphragm 19 and piston 32 to develop force in an axial direction and control stroke position also acts on the diaphragm 19 — piston 32 — shield 41 combination to develop force in a lateral direction toward the central axis. Such forces are useful for opposing skewing forces from spring 46 and cooperate with piston 32 to develop axial spring compressing forces. The portion 41a of shield 41 acts as a thrust washer between the push or bearing plate 42 of piston 32 and the lowermost end of spring 46. The shield 41 is generally disc-shaped and is sized to pilot on the piston boss or tubular sleeve 43 of piston 32. Sleeve 43, of course, also pilots spring 46. The cylindrical extension portion 41b (which includes bridging portion 41c — see Condition 1 of FIG. 3A) of sleeve 41 supports diaphragm 19 for its complete length at full extension of spring 46. These portions 41b and 41c absorb the entire lateral force output of diaphragm 19 when it is pressurized and direct such force inwardly toward piston 32. Portions 41b and 41c thus present a large circumferential area substantially parallel to the central axis of mechanism 10.

As can be seen in FIG. 1, the cylindrical extension portion 41b of shield 41 blends smoothly off the edge of piston plate 42 so that the diaphragm 19 is not locally deformed and stressed (se particularly Condition 1 of FIG. 3A). This feature is important to the durability of diaphragm 19.

From the edge of piston plate 42, the diameter of shield 41 gradually and smoothly becomes greater as at bridging portion 41c until it blends into substantially straight cylindrical portion. The diameter of shield 41 at this point is greater than the diameter of spring 46 but, of course, less than the diameter of the vertical portion of side wall 11b of cap 11.

The diameter of cylindrical portion 41b is important and is preselected to provide a bridge for the diaphragm 19 such that the bridge distance is short enough to be made rigid by air pressure and able to resist spring skewing forces with only minor deflection, but long enough not to overstress and overflex the diaphragm 19 while it rolls from the shield 41 to the vertical portion of side wall 11b of cap 11 and vice versa.

Thus, the difference between the diameter of cylindrical portion 41b and side wall 11b of cap 11 is preferably about four to six times the thickness of diaphragm 19. The side wall 11b of cap 11 thus acts as a first absorbing means for absorbing outwardly directed force from diaphragm 19 when diaphragm 19 is pressurized during the reciprocating stroke of piston 32 into the form of a hollow annular ring within actuating chamber 20. The cylindrical portion 11b acts as a second absorbing means on said diaphragm 19 when the diaphragm 19 is pressurized during the reciprocating stroke of piston 32.

The constant value of centering force provided by the shield-piston-diaphragm combination is important. At full bottom stroke, a pressure of 30 psi, approximately, is required to start compression of spring 46 and start the motion of the piston toward the "off" position, while 80 psi, approximately, is required to reach the "off" position. The maximum amount of shield-diaphragm contact, and hence area, is at full bottom stroke. At all points of lesser stroke, the contact area is decreased. The pressure to decrease the stroke of the piston increases, however, in direct proportion to stroke. The result is that a more or less constant force is developed on the shield 41 until full "off" stroke is approached and the diaphragm 19 no longer contacts the shield 41 a significant amount. This is to say that the lateral force developed by the diaphragm 19 on the shield 41 and acting to guide and centralize the piston exists over all of the stroke length except for a small portion at full "off" and is essentially constant during the effective range of contact.

A second point of importance is that the shape of the pressurized diaphragm 19 without the shield 41 does not have inherent ability to resist deflection caused by the skewing forces of the spring 46 because the bridge is too long and therefore insufficiently rigid to employ the side wall 11b of cap 11 as a reaction to the skewing force. With the shield 41, the shape of the diaphragm 19 is controlled to a short bridge of relatively constant length and shape throughout its entire working stroke. The same skewing force imposed on the short bridge cannot cause as much lateral deflection as in the long bridge. A piston guidance and alignment means is therefore obtained by means of the proper placement and selection of shield 41.

In addition, the arrangement of piston 32, shown in FIG. 1, in the chamber 20, is such that when piston 32 is reciprocated as shown in FIG. 2 and discussed hereinabove, the action between the inner adjacent portion of side wall 11b of cap 11 and the outer surface of the sleeve 43 of piston 32, as well as bolt 49 and aperture 45 and the inner surface of piston 32 and cap 54, acts as guide means for the piston 32. That is, during reciprocation of piston 32 upon actuation of spring 46, there is a restriction against excessive tilting or lateral movement of the bearing plate 42 of piston 32 in the chamber 20 of the housing (i.e., cap 11). However, it is necessary that the piston 32 seat itself when it returns to the cocked — FIG. 3B — position. This is accomplished in part by combination of the narrowed neck portion of the actuating chamber, piloting of piston 32 on threaded member 49 and the shield 41. If the piston 32 is not so guided, the elongated portion thereof (i.e., the piston boss 43) might strike against the sides of the upper portion of the actuating chamber (below the narrowed neck portion) resulting in either malfunction of the emergency brake or excessive wear on the piston boss. Sufficient tolerances are necessary to closely guide such pistons when they move between cocked and uncocked positions to take care of piston wobble. However, applicant's unique guiding means, as disclosed hereinabove, eliminates the necessity for internal components within the actuating chamber 20 for guiding the piston 32 through its entire stroke. Thus, elements which can wear or interfere with operation of piston 32 are eliminated.

It can be seen from the foregoing that we have described a unique brake mechanism having a narrowed neck portion at the upper end of the actuating chamber with a unique piston movable therein when in a cocked position. The shield 41 serves to both prevent the piston 32 from excessive tilting and guard the diaphragm from puncture should the spring break. As can be seen in FIG. 3A, once the piston 32 is unseated by moving out of the cocked position, it is not guided, except for threaded shaft 49, by any internal means. Suitable internal structure, as indicated above, is necessary but such structure is eliminated by our unique brake mechanism.

We claim as our invention:

1. A brake-actuating mechanism for use in a pneumatic brake system comprising:

a generally cylindrical housing having a longitudinal axis and closed at the upper end by an axially apertured emergency cap having a top and a generally cylindrical side wall and closed at the lower end by an axially apertured service cap;

an axially apertured divider wall associated with said housing dividing said housing into an upper emergency chamber and a lower service chamber;

an emergency diaphragm hermetically sealed within said emergency chamber dividing said emergency chamber into an upper actuating chamber and a lower pressure chamber, the upper actuating chamber including a lower portion and an integral upper narrowed neck portion having its longitudinal axis generally aligned with the axis of the aperture in said emergency cap, the cross section of said narrowed neck portion being substantially less than the cross section of the lower portion of said upper actuating chamber;

a service diaphragm hermetically sealed within said service chamber;

first pressurized fluid conduit means in fluid communication with both the exterior of said housing and the interior of said pressure chamber for introducing pressurized fluid therein;

second pressurized fluid conduit means in fluid communication with both the exterior of said housing and the interior of said service chamber between said divider wall and said service diaphragm for introducing pressurized fluid therein;

an axially mounted brake-operating rod extending through said service cap aperture and slidable therein, said rod being operatively connected to said service diaphragm, said service diaphragm being movable therewith;

a push rod extending through the aperture in said divider wall and slidably, hermetically and axially mounted therein, said push rod being operatively connected to both said emergency and said service diaphragms with said service and emergency diaphragms being movable therewith;

a piston axially disposed in said actuating chamber having a generally flat horizontal bearing plate portion in contact with said emergency diaphragm on the side of said emergency diaphragm opposite said divider wall and an integral upstanding pilot boss axially mounted on and fixedly secured to said bearing plate portion, said pilot boss having an aperture extending axially thereof with a smaller aperture at the top thereof;

a threaded member axially mounted in said actuating chamber within the larger aperture of said pilot boss and extending from the exterior of said actuating chamber and to a point above said emergency diaphragm and below said pilot boss when said piston is in a cocked position, said threaded member including a stop member fixedly secured at its lower end greater in overall width than the smaller aperture at the top of said pilot boss;

urging means associated with said housing for urging the bearing plate portion of said piston and said emergency diaphragm from a cocked position toward said divider wall, said urging means including an actuating spring mounted axially about said pilot boss and extending from the top of the lower portion of said upper actuating member to said bearing plate portion and confined entirely within the lower portion of said actuating chamber when said piston and said emergency diaphragm are in said cocked position, the boss of said piston extending substantialy the entire vertical length of said actuating chamber and above the upper end of said spring to the upper end of said upper narrowed neck portion and seated therein when said piston and said emergency diaphragm are in said cocked position; and piston guiding and aligning means associated with said actuating chamber for both shielding said emergency diaphragm from contact with said spring while axially guiding and aligning said piston and said actuating spring when said actuating spring moves said piston in reciprocating stroke motion, said piston guiding and aligning means including an apertured disc-like portion disposed within said actuating chamber, said pilot boss of said piston extending through the aperture of said disc-like portion with said disc-like portion extending generally parallel to said bearing plate portion between said bearing plate portion and the lowermost end of said spring and having a generally cylindrical extension portion leading from said disc-like portion to a point spaced inwardly from the inner wall of said emergency cap and outwardly away from said spring and generally parallel to the longitudinal axis of said housing, said piston guiding and aligning means further including said threaded member which guides said pilot boss as said piston moves between its cocked and uncocked positions and along said threaded member;

said disc-like portion extending substantially from the junction of said bearing plate portion of said piston with said pilot boss to substantially the outer extremity of said bearing plate portion and then curving outwardly and upwardly to form said cylindrical portion, the diameter of said cylindrical portion being large enough to surround said spring but small enough to provide a bridging space about four to six times the thickness of said emergency diaphragm between the outer diameter of said cylindrical portion and the inner diameter of said side wall of said emergency cap and the length of said cylindrical portion being at least equal to the length of the portion of said emergency diaphragm which comes into contact with said cylindrical portion to provide support for said diaphragm in its most extended position when said piston is urged toward said divider wall by said actuating spring.

2. The mechanism of claim 1 wherein said disc-like portion includes an upstanding flange at its aperture.

* * * * *